(12) United States Patent
Omran et al.

(10) Patent No.: US 12,491,504 B1
(45) Date of Patent: Dec. 9, 2025

(54) COBALT OXIDE/CALCIUM SILICATE @GRAPHITIC CARBON NITRIDE (COO/CASIO3@G-C3N4) NANOCOMPOSITE AS A PHOTOCATALYST

(71) Applicant: IMAM MOHAMMAD IBN SAUD ISLAMIC UNIVERSITY, Riyadh (SA)

(72) Inventors: Mohamed Khairy Abdel Fattah Omran, Riyadh (SA); Babiker Yagoub Elhadi Abdulkhair, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/256,034

(22) Filed: Jun. 30, 2025

(51) Int. Cl.
| | | |
|---|---|---|
| *B01J 35/39* | (2024.01) | |
| *B01J 21/18* | (2006.01) | |
| *B01J 23/02* | (2006.01) | |
| *B01J 23/75* | (2006.01) | |
| *B01J 35/40* | (2024.01) | |
| *B01J 35/50* | (2024.01) | |
| *C02F 1/00* | (2023.01) | |
| *C02F 1/32* | (2023.01) | |

(52) U.S. Cl.
CPC ............. *B01J 35/39* (2024.01); *B01J 21/18* (2013.01); *B01J 23/02* (2013.01); *B01J 23/75* (2013.01); *B01J 35/40* (2024.01); *B01J 35/50* (2024.01); *C02F 1/001* (2013.01); *C02F 1/32* (2013.01); *C02F 2305/10* (2013.01)

(58) Field of Classification Search
None
See application file for complete search history.

(56) References Cited

FOREIGN PATENT DOCUMENTS

| CN | 110465317 A | 11/2019 |
|---|---|---|
| CN | 114100655 A | 3/2022 |
| CN | 116493033 A | 7/2023 |

OTHER PUBLICATIONS

Guangyuan Yao, et al., "Synthesis and enhanced visible-light photocatalytic activity of wollastonite/g-C3N4 composite", Materials Research Bulletin, vol. 86, Oct. 25, 2016, pp. 186-193.
Feng Guo, et al., "Facile fabrication of a CoO/g-C3N4 p—n heterojunction with enhanced photocatalytic activity and stability for tetracycline degradation under visible light", Catalysis Science & Technology, vol. 7, Issue 15, Jun. 30, 2017, pp. 3325-3331, 7 pages.

*Primary Examiner* — Stefanie J Cohen
(74) *Attorney, Agent, or Firm* — Oblon, McClelland, Maier & Neustadt, L.L.P.

(57) ABSTRACT

A method of water purification includes mixing contaminated water with a cobalt oxide/calcium silicate @graphitic carbon nitride (CoO/CaSiO$_3$@g-C$_3$N$_4$) nanocomposite material to form a reaction mixture, exposing the reaction mixture to light, and removing the nanocomposite material using filtration to form purified water. The nanocomposite material includes hexagonal metal oxide nanoparticles including a CoO phase and a CaSiO$_3$ phase dispersed on a matrix of g-C$_3$N$_4$ nanosheets, where the hexagonal metal oxide nanoparticles have an average particle diameter in a range from 340 to 440 nanometer (nm). The nanocomposite material has a band gap energy in a range from 1.5 to 3.75 electron volt (eV).

20 Claims, 5 Drawing Sheets

COBALT OXIDE/CALCIUM SILICATE @GRAPHITIC CARBON NITRIDE (COO/CASIO3@G-C3N4) NANOCOMPOSITE AS A PHOTOCATALYST

BACKGROUND

Technical Field

The present disclosure is directed to a nanocomposite, and more particularly, a nanocomposite including cobalt oxide (CoO), calcium silicate ($CaSiO_3$) and graphitic carbon nitride (g-$C_3N_4$) as an effective photocatalyst for removal of pollutants from wastewater.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

Environmental contamination by heavy metal ions and organic pollutants has become a major global concern due to their high toxicity, carcinogenic nature and possibly non-biodegradable characteristics. Industrial activities such as mining, metal finishing, textile production and chemical manufacturing are among the primary contributors to contaminant pollution. These contaminants, when discharged untreated into water bodies can enter the food chain and pose serious health risks, including cancer, neurological disorders and organ damage.

Among various remediation strategies, adsorption has gained considerable attention due to its simplicity, cost-effectiveness, and efficiency at trace-level contaminant removal (Sing, D., et al., Citric acid coated magnetic nanoparticles: synthesis, characterization and application in removal of Cd (II) ions from aqueous solution, *Journal of Water Process Engineering*, 2014, 4, 233-241). In this context, graphitic carbon nitride (g-$C_3N_4$) has emerged as a promising metal-free adsorbent and photocatalyst. It offers numerous advantages such as chemical and thermal stability, visible light activity and ease of synthesis. However, its practical application is often limited by a relatively low surface area and fast recombination of photogenerated charge carriers.

To overcome these shortcomings, researchers have explored heteroatom doping, microstructure modifications and the incorporation of metal or metal oxide nanoparticles with g-$C_3N_4$ nanosheets. Notable examples include $MgY_2O_4$-g-$C_3N_4$, $O_x$-g-$C_3N_4$/Pani-NF, and $CoFe_2O_4$-g-$C_3N_4$ for copper ion removal, as well as CdS/g-$C_3N_4$, $Y_2O_3$@g-$C_3N_4$, and ZnO-g-$C_3N_4$ for cadmium ion exclusion (Sharma, D., et al., In-situ synthesis of ZnO modified g-$C_3N_4$ composite: a potential photocatalyst and adsorbent for wastewater remediation, *Materials research innovations*, 2022, 26, 2, 65-75), (Li, D., et al., Electrochemical hydrogen evolution reaction efficiently catalyzed by Ru—N coupling in defect-rich Ru/g-$C_3N_4$ nanosheets, *Journal of Materials Chemistry A*, 2021, 9, 26, 15019-15026).

In comparison to traditional activated carbon, g-$C_3N_4$-based systems offer enhanced photoactivity and broader visible light absorption, further advancing their potential in photocatalytic and sustainable energy technologies.

Accordingly, it is one object of the present disclosure to provide nanocomposite material that addresses these limitations by enhancing the adsorption capacity, photocatalytic efficiency, and stability under real-world conditions.

SUMMARY

In an exemplary embodiment, a method of water purification is described. The method includes mixing contaminated water with a cobalt oxide/calcium silicate @graphitic carbon nitride (CoO/$CaSiO_3$@g-$C_3N_4$) nanocomposite material to form a reaction mixture and further, exposing the reaction mixture to light and removing the nanocomposite material using filtration to form purified water. The nanocomposite material includes hexagonal metal oxide nanoparticles, including a CoO phase and a $CaSiO_3$ phase, dispersed on a matrix of g-$C_3N_4$ nanosheets, where the hexagonal metal oxide nanoparticles have an average particle diameter in a range from 340 to 440 nanometers (nm). The nanocomposite material has a band gap energy in a range from 1.5 to 3.75 electron volt (eV).

In some embodiments, the nanocomposite material has a band gap energy in a range from 2.0 to 3.5 eV.

In some embodiments, the nanocomposite material has a band gap energy in a range from 2.25 to 3.25 eV.

In some embodiments, the nanocomposite material has a band gap energy in a range from 2.5 to 3.15 eV.

In some embodiments, the nanocomposite material has a band gap energy in a range from 2.7 to 3.05 eV.

In some embodiments, the nanocomposite material has a band gap energy of 2.88 eV.

In some embodiments, the hexagonal metal oxide nanoparticles have an average particle diameter in a range from 370 to 410 nm.

In some embodiments, the hexagonal metal oxide nanoparticles have an average particle diameter in a range from 380 to 400 nm.

In some embodiments, the hexagonal metal oxide nanoparticles have an average particle diameter in a range from 382 to 395 nm.

In some embodiments, the CoO/$CaSiO_3$@g-$C_3N_4$ nanocomposite material has a mass ratio of CoO:$CaSiO_3$:g-$C_3N_4$ phases in a range from 0.25-10:0.25-10:0.25-10.

In some embodiments, the nanocomposite material has a Brunauer-Emmett-Teller (BET) surface area of at least 20 square meters per gram ($m^2 \cdot g^{-1}$).

In some embodiments, the nanocomposite material has a BET surface area of at least 25 $m^2 \cdot g^{-1}$.

In some embodiments, the nanocomposite material has a BET surface area of at least 30 $m^2 \cdot g^{-1}$.

In some embodiments, the nanocomposite material has a BET surface area of 30.68 $m^2 \cdot g^{-1}$.

In some embodiments, the nanocomposite material has a pore volume of at least 0.10 cubic centimeters per gram ($cm^3 \cdot g^{-1}$).

In some embodiments, the nanocomposite material has a pore volume of at least 0.15 $cm^3 \cdot g^{-1}$.

In some embodiments, the nanocomposite material has a pore volume of at least 0.195 $cm^3 \cdot g^{-1}$.

In some embodiments, the nanocomposite material has an average pore diameter in a range from 10 to 30 nm.

In some embodiments, the nanocomposite material has an average pore diameter in a range from 15 to 27 nm.

In some embodiments, the nanocomposite material has an average pore diameter of 21.82 nm.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
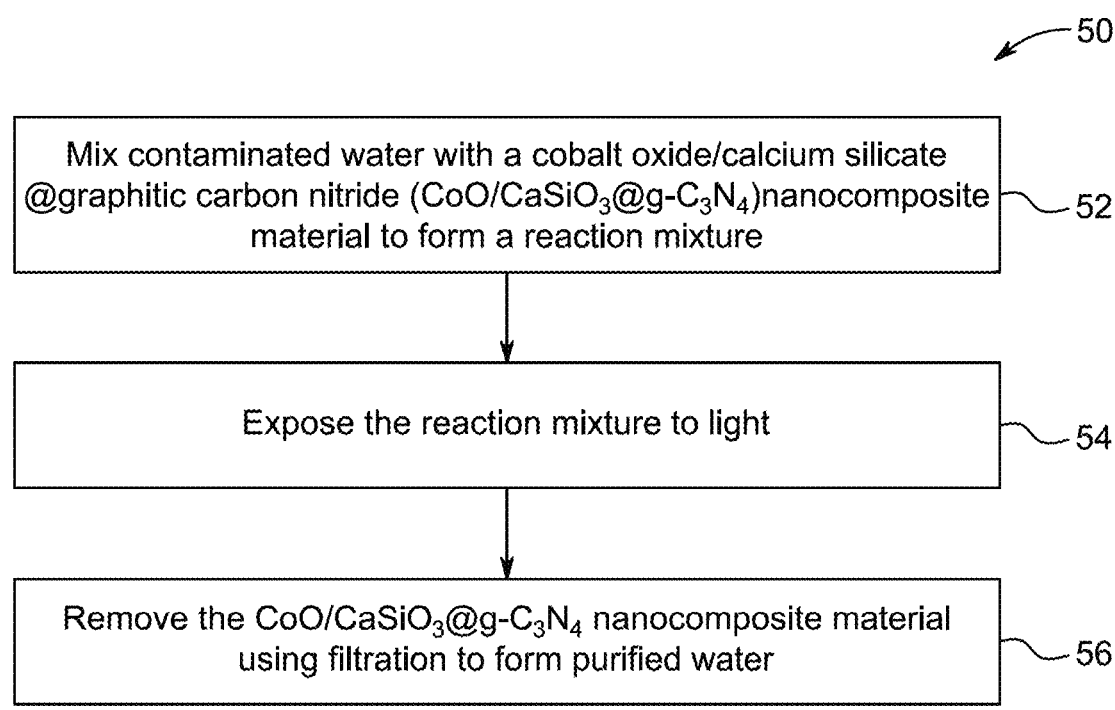
FIG. 1 is a flowchart depicting a method for water purification, according to certain embodiments.

When describing the present disclosure, the terms used are to be construed in accordance with the following definitions, unless a context dictates otherwise.

Embodiments of the present disclosure will now be described more fully hereinafter with reference to the accompanying drawings wherever applicable, in that some, but not all, embodiments of the disclosure are shown.

In the drawings, like reference numerals designate identical or corresponding parts throughout the several views. Further, as used herein, the words 'a,' 'an' and the like generally carry a meaning of 'one or more,' unless stated otherwise.

Furthermore, the terms 'approximately,' 'approximate,' 'about,' and similar terms generally refer to ranges that include the identified value within a margin of 20%, 10%, or preferably 5%, and any values therebetween.

As used herein, the term 'room temperature' refers to a temperature range of '25 degrees Celsius (° C.)±3° C. in the present disclosure.

As used herein, the term 'nanocomposite' refers to a composite material in which at least one dimension of the component is in the nanometer size scale (<1000 nanometer (nm)). The nanocomposites are thus poly-phase solid materials made up of one or more nanomaterials. The term includes all types of multiphase solid materials in which one of the phases has one, two, or three dimensions of less than 1000 nm, or structures having nanoscale repeat distances between the different phases that make up the material.

As used herein, the term 'nanoparticles (NPs)' refers to particles having a particle size of 1 nm to 1000 nm within the scope of the present disclosure. The NPs may exist in various morphological shapes, such as nanotubes, nanowires, nanospheres, nanosheets, nanocrystals, nanorectangles, nanotriangles, nanopentagons, nanohexagons, nanoprisms, nanodisks, nanocubes, nanoribbons, nanoblocks, nanobeads, nanotoroids, nanodiscs, nanobarrels, nanogranules, nanowhiskers, nanoflakes, nanofoils, nanopowders, nanoboxes, nanostars, tetrapods, nanobelts, nano-urchins, nanoflowers, etc., and mixtures thereof.

As used herein, the term g-C$_3$N$_4$ nanosheets refers to thin, two-dimensional sheets of graphitic carbon nitride (g-C$_3$N$_4$), a material composed of carbon, nitrogen, and hydrogen atoms arranged in a graphitic-like structure. These nanosheets are typically several nanometers thick and possess high surface area and unique electronic properties, making them suitable for various applications, including photocatalysis, energy storage, and sensing. The nanosheets can enhance the material's photocatalytic efficiency by providing more active sites for reactions and improving the separation of charge carriers under visible light irradiation.

In this application, a numerical value interval (i.e., a numerical value range) is involved, and, if not specifically stated, an optional numerical value distribution is considered continuous within the numerical value interval, and includes two numerical value endpoints (i.e., minimum and maximum values) of the numerical value range, and each numerical value between the two numerical value endpoints.

The temperature parameters in the present application, if not specifically limited, are both allowed to be constant temperature processing and also allowed to be varied within a certain temperature interval. It should be understood that the constant temperature processing allows the temperature to fluctuate within the precision range of the instrument control. It is allowed to fluctuate in the range of, for example, 5° C., 4° C., 3° C., 2° C. and 1° C.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include $^{13}$C and $^{14}$C. Isotopes of oxygen include $^{16}$O, $^{17}$O, and $^{18}$O. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

As used herein, the term 'contaminated water' refers to water that contains harmful substances, including but not limited to organic pollutants, heavy metals, toxic chemicals, industrial effluents, and other hazardous materials, which negatively affect water quality and pose a risk to human health and the environment. Contaminants in such water can include substances like heavy metals (e.g., cadmium, chromium, copper, lead, and zinc), industrial dyes, pesticides, pharmaceuticals, and other pollutants.

As used herein, the term 'photocatalysis' refers to a process in which a photocatalyst absorbs UV (ultraviolet) or visible light and, upon activation, accelerates a chemical reaction without being consumed in the process. This reaction typically involves the degradation or transformation of pollutants, organic compounds, or harmful substances in the presence of light. Photocatalysis is widely used in environmental applications, such as water purification, air cleaning, and solar energy conversion, as the photocatalyst facilitates the breakdown of contaminants into harmless byproducts, often producing environmentally friendly results.

As used herein, the term 'BET' refers to the Brunauer-Emmett-Teller method, a widely used technique for determining the surface area and porosity of materials. It is based on the adsorption of nitrogen gas onto the surface of the material and is commonly employed to calculate specific surface area, pore volume, and pore size distribution.

As used herein, the term 'porosity' refers to a measure of the void or vacant spaces within a material.

As used herein, the term 'pore diameter' refers to an average width or size of the pores (void spaces) within a material, typically measured in nm or angstroms (Å). It is a useful parameter in characterizing the texture and permeability of porous materials, influencing their adsorption, filtration, or catalytic properties. The pore diameter is often determined using methods such as nitrogen adsorption or mercury intrusion, which provide insights into the material's ability to absorb or interact with molecules of specific sizes.

As used herein, the term 'pore volume' refers to the total volume of void spaces (pores) within a material that is capable of being filled by a gas or liquid. It is typically expressed in cubic centimeters per gram ($cm^3/g$) and is a useful parameter in characterizing the porous structure of materials, such as adsorbents or catalysts.

As used herein, the term 'trimodal pore size distribution' refers to a material having three distinct pore size populations or peaks within its pore size distribution.

As used herein, the term 'average particle diameter' refers to the mean size of particles within a given sample, typically measured in nm or micrometers (μm). It is calculated by averaging the diameters of many individual particles, often determined using techniques such as dynamic light scattering (DLS), transmission electron microscopy (TEM), or scanning electron microscopy (SEM).

As used herein, the term 'band gap energy' refers to the energy difference between the valence band and the conduction band of a material. It represents the minimum energy required to excite an electron from the valence band to the conduction band, enabling electrical conduction. In the context of photocatalysts, the band gap energy determines the material's ability to absorb light and initiate photocatalytic reactions. A smaller band gap allows the material to absorb visible light more effectively, enhancing its photocatalytic activity under visible light irradiation. The band gap is typically measured in electron volts (eV).

Aspects of this disclosure are directed to a method of water purification using a nanocomposite of cobalt oxide (CoO), calcium silicate ($CaSiO_3$) and graphitic carbon nitride (g-$C_3N_4$). The nanocomposite material fabricated by the method described in the present disclosure achieves a multi-phase crystalline structure with controlled morphology and enhanced structural properties for photocatalytic degradation of the water contaminants.

A CoO/$CaSiO_3$@g-$C_3N_4$ nanocomposite material is described. The CoO/$CaSiO_3$@g-$C_3N_4$ nanocomposite material comprises hexagonal metal oxide nanoparticles including a CoO phase and a $CaSiO_3$ phase dispersed on a matrix of g-$C_3N_4$ nanosheets. In some embodiments, the metal oxide nanoparticles dispersed on g-$C_3N_4$ nanosheets may be in the form of nanospheres, nanorods, nanowires, and nanocubes. In a preferred embodiment, the nanocomposite material includes hexagonal metal oxide nanoparticles including a CoO phase and a $CaSiO_3$ phase dispersed on a matrix of g-$C_3N_4$ nanosheets, where the hexagonal metal oxide nanoparticles have an average particle diameter in a range from 300 to 500 nm, preferably 340 to 440 nm.

In some embodiments, the hexagonal metal oxide nanoparticles have an average particle diameter in a range from 370-410 nm, preferably 371-409 nm, preferably 372-408 nm, preferably 373-407 nm, preferably 374-406 nm, preferably 375-405 nm, preferably 374-404 nm, preferably 375-403 nm, preferably 376-402 nm, preferably 377-401 nm, preferably 378-400 nm, preferably 379-399 nm, preferably 380-398 nm, preferably 381-397 nm, preferably 382-396 nm, preferably 383-395 nm, preferably 384-394 nm, preferably 385-393 nm and preferably 386-392 nm.

In some embodiments, the hexagonal metal oxide nanoparticles have an average particle diameter in a range from 380-400 nm, preferably 381-399 nm, preferably 382-398 nm, preferably 383-397 nm, preferably 384-396 nm, preferably 385-395 nm and preferably 386-394 nm.

In some embodiments, the hexagonal metal oxide nanoparticles have an average particle diameter in a range from 382-395 nm, preferably 382.1-394.9 nm, preferably 382.3-394.7 nm, preferably 382.5-394.5 nm, preferably 382.9-394.3 nm, preferably 383-394 nm, preferably 383.2-392.8 nm, preferably 383.4-392.6 nm, preferably 383.6-392.4 nm, preferably 383.8-392.2 nm, preferably 384-392 nm, preferably 384.2-391.8 nm, preferably 384.4-391.6 nm, preferably 384.6-391.4 nm, preferably 384.8-391.2 nm, preferably 385-391 nm, preferably 385.2-390.8 nm, preferably 385.4-390.6 nm, preferably 385.6-390.6 nm, preferably 385.8-390.4 nm, preferably 386-390 nm, preferably 386.4-389.6 nm and preferably 386.8-389.4 nm. In a preferred embodiment, the hexagonal metal oxide nanoparticles have an average particle diameter of 387 nm.

In one or more embodiments, the CoO/$CaSiO_3$@g-$C_3N_4$ nanocomposite material has a mass ratio of the CoO:$CaSiO_3$:g-$C_3N_4$ phases in a range from 0.1-15:0.1-15:0.1-15, preferably 0.25-10:0.25-10:0.25-10, preferably 0.5-7.5:0.5-7.5:0.5-7.5, preferably 0.75-6:0.75-6:0.75-6, preferably 1-5:1-5:1-5.

The BET hypothesis is the foundation for a useful analysis method for determining the specific surface area of a material. It attempts to explain the physical adsorption of gas molecules on a solid surface. Specific surface area is a property of solids, which is the total surface area of a material per unit of mass, solid or bulk volume, or cross-sectional area. In some embodiments, pore diameter, pore volume, and BET surface area are measured by gas adsorption analysis, preferably $N_2$ adsorption analysis (e.g., $N_2$ adsorption isotherms).

In some embodiments, the average pore distribution of the nanocomposite may include, but is not limited to, crystalline average pore distribution, bimodal, trimodal, multimodal, narrow, broad, and Gaussian. In a preferred embodiment, the average pore distribution of nanocomposite is unimodal, indicating a single dominant pore size within the material. This unimodal distribution indicates that the nanocomposites possess a relatively narrow pore size range, resulting in more uniform pore structures and enhancing specific properties such as adsorption capacity, catalytic activity, or surface reactivity.

In some embodiments, the nanocomposite material has a BET surface area of at least 10 square meters per gram ($m^2 \cdot g^{-1}$), preferably at least 20 $m^2 \cdot g^{-1}$, preferably at least 20.5 $m^2 \cdot g^{-1}$, preferably at least 21 $m^2 \cdot g^{-1}$, preferably at least 21.5 $m^2 \cdot g^{-1}$, preferably at least 22 $m^2 \cdot g^{-1}$, preferably at least 22.5 $m^2 \cdot g^{-1}$, preferably at least 23 $m^2 \cdot g^{-1}$, preferably at least 23.5 $m^2 \cdot g^{-1}$, preferably at least 24 $m^2 \cdot g^{-1}$, preferably at least 24.5 $m^2 \cdot g^{-1}$, preferably at least 25 $m^2 \cdot g^{-1}$, preferably at least 25.5 $m^2 \cdot g^{-1}$, preferably at least 26 $m^2 \cdot g^{-1}$, preferably at least 26.5 $m^2 \cdot g^{-1}$, preferably at least 27 $m^2 \cdot g^{-1}$, preferably at least 27.5 $m^2 \cdot g^{-1}$, preferably at least 28 $m^2 \cdot g^{-1}$, preferably at least 28.5 $m^2 \cdot g^{-1}$, preferably at least 29 $m^2 \cdot g^{-1}$, preferably at least 29.5 m²·g⁻¹, preferably at least 29.6 m²·g⁻¹, preferably at least 29.7 m²·g⁻¹, preferably at least 29.8 m²·g⁻¹, preferably at least 29.9 m²·g⁻¹, preferably at least 30 m²·g⁻¹, preferably at least 30.1 m²·g⁻¹, preferably at least 30.2 m²·g⁻¹, preferably at least 30.3 m²·g⁻¹, preferably at least 30.4 m²·g⁻¹ and preferably at least 30.5 m²·g⁻¹.

In some embodiments, the nanocomposite material has a BET surface area of at least 25 m²·g⁻¹, preferably at least 25.5 m²·g⁻¹, preferably at least 25.6 m²·g⁻¹, preferably at least 25.7 m²·g⁻¹, preferably at least 25.8 m²·g⁻¹, preferably at least 25.9 m²·g⁻¹, preferably at least 30 m²·g⁻¹, preferably at least 30.1 m²·g⁻¹, preferably at least 30.2 m²·g⁻¹, preferably at least 30.3 m²·g⁻¹, preferably at least 30.4 m²·g⁻¹ and preferably at least 30.5 m²·g⁻¹.

In some embodiments, nanocomposite material has a BET surface area of at least 30 m²·g⁻¹, preferably at least 30.1 m²·g⁻¹, preferably at least 30.2 m²·g⁻¹, preferably at least 30.3 m²·g⁻¹, preferably at least 30.4 m²·g⁻¹ and preferably at least 30.5 m²·g⁻¹. In a preferred embodiment, the nanocomposite material has a BET surface area of 30.68 m²·g⁻¹.

In some embodiments, the nanocomposite material has a pore volume of at least 0.05 cubic centimeters per gram (cm³·g⁻¹), preferably at least 0.10 cm³·g⁻¹, preferably at least 0.11 cm³·g⁻¹, preferably at least 0.12 cm³·g⁻¹, preferably at least 0.13 cm³·g⁻¹, preferably at least 0.14 cm³·g⁻¹, preferably at least 0.15 cm³·g⁻¹, preferably at least 0.16 cm³·g⁻¹, preferably at least 0.17 cm³·g⁻¹, preferably at least 0.18 cm³·g⁻¹, preferably at least 0.19 cm³·g⁻¹, preferably at least 0.191 cm³·g⁻¹, preferably at least 0.192 cm³·g⁻¹, preferably at least 0.193 cm³·g⁻¹, preferably at least 0.194 cm³·g⁻¹ and preferably at least 0.195 cm³·g⁻¹ In some embodiments, the nanocomposite material has a pore volume of at least 0.15 cm³·g⁻¹, preferably at least 0.152 cm³·g⁻¹, preferably at least 0.156 cm³·g⁻¹, preferably at least 0.158 cm³·g⁻¹, preferably at least 0.160 cm³·g⁻¹, preferably at least 0.162 cm³·g⁻¹, preferably at least 0.164 cm³·g⁻¹, preferably at least 0.166 cm³·g⁻¹, preferably at least 0.168 cm³·g⁻¹, preferably at least 0.170 cm³·g⁻¹, preferably at least 0.172 cm³·g⁻¹, preferably at least 0.174 cm³·g⁻¹, preferably at least 0.176 cm³·g⁻¹, preferably at least 0.178 cm³·g⁻¹, preferably at least 0.18 cm³·g⁻¹, preferably at least 0.182 cm³·g⁻¹, preferably at least 0.184 cm³·g⁻¹, preferably at least 0.186 cm³·g⁻¹, preferably at least 0.188 cm³·g⁻¹, preferably at least 0.190 cm³·g⁻¹, preferably at least 0.191 cm³·g⁻¹, preferably at least 0.192 cm³·g⁻¹, preferably at least 0.193 cm³·g⁻¹, preferably at least 0.194 cm³·g⁻¹ and preferably at least 0.195 cm³·g⁻¹. In a preferred embodiment, the nanocomposite material has a pore volume of at least 0.195 cm³·g⁻¹.

In some embodiments, the nanocomposite material has an average pore diameter in a range from 5-40 nm, preferably 10-30 nm, preferably 11-29.9 nm, preferably 11.5-29.8 nm, preferably 12-29.7 nm, preferably 12.5-29.6 nm, preferably 13-29.5 nm, preferably 13.5-29.4 nm, preferably 14-29.3 nm, preferably 14.5-29.2 nm, preferably 15-29.1 nm, preferably 15.5-29.0 nm, preferably 16-28.9 nm, preferably 16.5-28.8 nm, preferably 17-28.7 nm, preferably 17.5-28.6 nm, preferably 18-28.5 nm, preferably 18.5-28.4 nm, preferably 19-28.3 nm, preferably 19.5-28.2 nm, preferably 20-28.1 nm, preferably 20.5-28 nm and preferably 21-27 nm.

In some embodiments, the nanocomposite material has an average pore diameter in a range from 15-27 nm, preferably 15.1-26.9 nm, preferably 15.3-26.7 nm, preferably 15.5-26.5 nm, preferably 15.7-26.3 nm, preferably 15.9-26.1 nm, preferably 16.1-25.9 nm, preferably 16.3-25.7 nm, preferably 16.5-25.5 nm, preferably 16.7-25.3 nm, preferably 16.9-25.1 nm, preferably 17.1-24.9 nm, preferably 17.3-24.7 nm, preferably 17.5-24.5 nm, preferably 17.7-24.3 nm, preferably 17.9-24.1 nm, preferably 18.1-23.9 nm, preferably 18.3-23.7 nm, preferably 18.5-23.5 nm, preferably 18.7-23.3 nm, preferably 18.9-23.1 nm, preferably 19.1-22.9 nm, preferably 19.3-22.7 nm, preferably 19.5-22.5 nm, preferably 19.7-22.3 nm, preferably 19.9-22.1 nm and preferably 20.1-21.9 nm. In a preferred embodiment, the nanocomposite material has an average pore diameter of 21.82 nm.

In some embodiments, the nanocomposite material has a band gap energy in a range from 1.0-4.0 electron volt (eV), preferably 1.5-3.75 electron volt (eV), preferably 1.7-3.74 eV, preferably 1.8-3.72 eV, preferably 1.9-3.70 eV, preferably 2.0-3.68 eV, preferably 2.1-3.66 eV, preferably 2.2-3.64 eV, preferably 2.4-3.62 eV, preferably 2.6-3.60 eV and preferably 2.8-3.58 eV.

In some embodiments, the nanocomposite material has a band gap energy in a range from 2.0-3.5 eV, preferably 2.1-3.4 eV, preferably 2.2-3.3 eV, preferably 2.3-3.2 eV, preferably 2.4-3.1 eV, preferably 2.5-3.0 eV and preferably 2.6-2.9 eV.

In some embodiments, the nanocomposite material has a band gap energy in a range from 2.25-3.25 eV, preferably 2.26-3.24 eV, preferably 2.28-3.23 eV, preferably 2.30-3.22 eV, preferably 2.32-3.21 eV, preferably 2.34-3.20 eV, preferably 2.36-3.19 eV, preferably 2.38-3.18 eV, preferably 2.40-3.17 eV, preferably 2.42-3.16 eV, preferably 2.44-3.15 eV, preferably 2.46-3.14 eV, preferably 2.48-3.13 eV, preferably 2.50-3.12 eV, preferably 2.52-3.11 eV, preferably 2.54-3.10 eV, preferably 2.56-3.09 eV, preferably 2.58-3.08 eV, preferably 2.60-3.07 eV, preferably 2.62-3.06 eV, preferably 2.64-3.04 eV, preferably 2.66-3.02 eV, preferably 2.68-3.0 eV, preferably 2.70-2.98 eV, preferably 2.72-2.96 eV, preferably 2.74-2.94 eV, preferably 2.76-2.90 eV and preferably 2.78-2.89 eV.

In some embodiments, the nanocomposite material has a band gap energy in a range from 2.5-3.15 eV, preferably 2.51-3.14 eV, preferably 2.52-3.13 eV, preferably 2.53-3.12 eV, preferably 2.54-3.11 eV, preferably 2.55-3.10 eV, preferably 2.56-3.09 eV, preferably 2.57-3.08 eV, preferably 2.58-3.07 eV, preferably 2.59-3.06 eV, preferably 2.60-3.05 eV, preferably 2.61-3.04 eV, preferably 2.62-3.03 eV, preferably 2.63-3.02 eV, preferably 2.64-3.01 eV, preferably 2.65-2.99 eV, preferably 2.66-2.98 eV, preferably 2.67-2.97 eV, preferably 2.68-2.96 eV, preferably 2.69-2.95 eV, preferably 2.70-2.94 eV, preferably 2.80-2.92 eV and preferably 2.85-2.90 eV.

In some embodiments, the nanocomposite material has a band gap energy in a range from 2.7-3.05 eV, preferably 2.71-3.05 eV, preferably 2.72-3.04 eV, preferably 2.73-3.03 eV, preferably 2.74-3.02 eV, preferably 2.75-3.01 eV, preferably 2.76-3.00 eV, preferably 2.77-2.99 eV, preferably 2.78-2.98 eV, preferably 2.79-2.97 eV, preferably 2.80-2.96 eV, preferably 2.81-2.95 eV, preferably 2.82-2.94 eV, preferably 2.83-2.93 eV, preferably 2.84-2.92 eV, preferably 2.85-2.90 eV, preferably 2.86-2.89 eV, preferably 2.87-2.88 eV. In a preferred embodiment, the nanocomposite material has a band gap energy of 2.88 eV.

Referring to FIG. 1, a method 50 for water purification using the nanocomposite material is described. The order in which the method 50 is described is not intended to be construed as a limitation, and any number of the described method steps can be combined to implement the method 50. Additionally, individual steps may be removed or skipped from the method 50 without departing from the spirit and scope of the present disclosure.

At step 52, the method 50 includes mixing contaminated water with a cobalt oxide/calcium silicate@graphitic carbon nitride (CoO/CaSiO$_3$@g-C$_3$N$_4$) nanocomposite material to form a reaction mixture. The contaminated water includes one or more pollutants. The pollutant is preferably an organic pollutant. Suitable examples of organic pollutants include, but are not limited to, pesticides, pharmaceuticals, dyes, and other synthetic or natural organic substances that can pose environmental or health risks. In alternate embodiments, the organic pollutants may be a dye, a phenol, a polycyclic aromatic hydrocarbon, an herbicide, a pesticide, a persistent organic pollutant, or the like. The contaminated water may be sourced from natural bodies of water, such as rivers, lakes, or oceans, or the aqueous medium may be obtained from industrial processes, wastewater treatment facilities, or laboratory settings.

In some embodiments, the pollutant is a dye. A dye is a colored substance that chemically binds to a material it may be intended to color. Generally, a dye is applied in solution, typically aqueous solution. Examples of dyes include, but are not limited to: acridine dyes, which are acridine and its derivatives such as acridine orange, acridine yellow, acriflavine, and gelgreen; anthraquinone dyes, which are anthraquinone and its derivatives such as acid blue 25, alizarin, anthrapurpurin, carminic acid, 1,4-diamno-2,3-dihydroanthraquinone, 7,14-dibenzypyrenequinone, dibromoanthrone, 1,3-dihydroxyanthraquinone, 1,4-dihydroxyanthraquinone, disperse red 9, disperse red 11, indanthrone blue, morindone, oil blue 35, parietin, quinizarine green SS, remazol brilliant blue R, solvent violet 13, 1,2,4-trihydroxyanthraquinone, vat orange 1, and vat yellow 1; diaryl methane dyes such as auramine O, triarylmethane dyes such as acid fuchsin, basic fuchsin, aluminon, aniline blue WS, aurin, aurintricarboxylic acid, brilliant blue FCF, brilliant green, bromocresol green, bromocresol purple, bromocresol blue, bromophenol blue, bromopyrogallol red, chlorophenol red, coomassie brilliant blue, cresol red, O-cresolphthalein, crystal violet, dichlorofluorescein, ethyl green, fast green FCT, FIAsH-EDT2, fluoran, fuchsine, green S, light green SF, malachite green, merbromin, metacresol purple, methyl blue, methyl violet, naphtholphthalein, new fuchsine, pararosaniline, patent blue V, phenol red, phenolphthalein, phthalein dye, pittacal, spirit blue, thymol blue, thymolphthalein, Victoria blue BO, Victoria blue R, water blue, xylene cyanol, and xylenol orange; azo dyes such as acid orange 5, acid red 13, alican yellow, alizarine yellow R, allura red AC, amaranth, amido black 10B, aniline yellow, arylide yellow, azo violet, azorubine, basic red 18, biebrich scarlet, Bismarck brown Y, black 7984, brilliant black BN, brown FK, chrysoine resorcinol, citrus red 2, congo red, D&C red 33, direct blue 1, disperse orange 1, eriochrome black T, evans blue, fast yellow AB, orange 1, hydroxynaphthol blue, janus green B, lithol rubine BK, metanil yellow, methyl orange, methyl red, methyl yellow, mordant brown 33, mordant red 19, naphthol AS, oil red O, oil yellow DE, orange B, orange G, orange GGN, para red, pigment yellow 10, ponceau 2R, prontosil, red 2G, scarlet GN, Sirius red, solvent red 26, solvent yellow 124, sudan black B, sudan I, sudan red 7B, sudan stain, tartrazine, tropaeolin, trypan blue, and yellow 2G; phthalocyanine dyes such as phthalocyanine blue BN, phthalocyanine Green G, Alcian blue, and naphthalocyanine, azin dyes such as basic black 2, mauveine, neutral red, Perkin's mauve, phenazine, and safranin; indophenol dyes such as indophenol and dichlorophenolindophenol; oxazin dyes; oxazone dyes; thiazine dyes such as azure A, methylene blue, methylene green, new methylene blue, and toluidine blue; thiazole dyes such as primuline, stains-all, and thioflavin; xanthene dyes such as 6-carboxyfluorescein, eosin B, eosin Y, erythosine, fluorescein, rhodamine B, rose bengal, and Texas red; fluorone dyes such as calcein, carboxyfluorescein diacetate succinimidyl ester, fluo-3, fluo-4, indian yellow, merbromin, pacific blue, phloxine, and seminaphtharhodafluor; or rhodamine dyes such as rhodamine, rhodamine 6G, rhodamine 123, rhodamine B, sulforhodamine 101, and sulforhodamine B.

A phenol is an organic compound including of a hydroxyl group (—OH) bonded directly to an aromatic hydrocarbon group. Examples of phenols include, but are not limited to, phenol (the namesake of the group of compounds), bisphenols (including bisphenol A), butylated hydroxytoluene (BHT), 4-nonylphenol, orthophenyl phenol, picric acid, phenolphthalein and its derivatives mentioned above, xylenol, diethylstilbestrol, L-DOPA, propofol, butylated hydroxyanisole, 4-tert-butylcatechol, tert-butylhydroquinone, carvacrol, chloroxyleol, cresol (including M-, O-, and P-cresol), 2,6-di-tert-butylphenol, 2,4-dimethyl-6-tert-butylphenol, 2-ethyl-4,5-dimethylphenol, 4-ethylguaiacol, 3-ethylphenol, 4-ethylphenol, flexirubin, mesitol, 1-nonyl-4-phenol, thymol, 2,4,6-tri-tert-butylphenol, chlorophenol (including 2-, 3-, and 4-chlorophenol), dichlorophenol (including 2,4- and 2,6-dichlorophenol), bromophenol, dibromophenol (including 2,4-dibromophenol), nitrophenol, norstictic acid, oxybenzone, and paracetamol (also known as acetoaminophen).

A polycyclic aromatic hydrocarbon (PAH) is an aromatic hydrocarbon composed of multiple aromatic rings. Examples of polycyclic aromatic hydrocarbons include naphthalene, anthracene, phenanthrene, phenalene, tetracene, chrysene, triphenylene, pyrene, pentacene, benzo[a]pyrene, corannulene, benzo[g,h,i]perylene, coronene, ovalene, benzo[c]fluorine, acenaphthene, acenaphthylene, benz[a]anthracene, benzo[b]fluoranthene, benzo[j]fluoranthene, benzo[k]fluoranthene, benzo[e]pyrene, cyclopenta[c,d]pyrene, dibenz[a,h]anthracene, dibenzo[a,e]pyrene, dibenzo[a,h]pyrene, dibenzo[a,i]pyrene, dibenzo[a,l]pyrene, fluoranthene, fluorine, indeno[1,2,3-c,d]pyrene, 5-methylchrysene, naphthacene, pentaphene, picene, and biphenylene.

A pesticide is a substance meant to prevent, destroy, or control pests including, but not limited to algae, bacteria, fungi, plants, insects, mites, snails, rodents, and viruses.

A pesticide intended for use against algae is known as an algicide. Examples of algicides include benzalkonium chloride, bethoxazin, cybutryne, dichlone, dichlorophen, diuron, endothal, fentin, isoproturon, methabenthiazuron, nabam, oxyfluorfen, pentachlorophenyl laurate, quinoclamine, quinonamid, simazine, terbutryn, and tiodonium.

A pesticide intended for use against bacteria is known as a bactericide. Examples of bactericides include antibiotics such as: aminoglycosides such as amikacin, gentamicin, kanamycin, neomycin, netilmicin, tobramycin, paromomycin, streptomycin, and spectinomycin; ansamycins such as geldanamycin, herbimycin, and rifaximin; carbacephems such as loracarbef, carbapenems such as ertapenem, doripenem, imipenem, and meropenem; cephalosporins such as cefadroxil, cefazolin, cephradine, cephapirin, cephalothin, cephalexin, cefaclor, cefoxitin, cefotetan, cefamandole, cefmetazole, cefonicid, cefprozil, cefuroxime, cefixime, cefdinir, cefditoren, cefoperazone, cefotaxime, cefpodoxime, cefazidime, ceftibuten, ceftizoxime, moxalactam, ceftriaxone, cefepime, cefaroline fosamil, and ceftobiprole; glycopeptides such as teicoplanin, vancomycin, telavancin, dalbavancin, and oritavancin; lincosamides such as clindamycin and lincomycin; lipopeptides such as daptomycin; macrolides such as azithromycin, clarithromycin, erythromycin, roxithromycin, telithromycin, spiramycin, and fidoxamicin; monobactams such as aztreonam; nitrofurans such as furazolidone and nitrofurantoin; oxazolidinones such as linezolid, posizolid, radezolid, and torezolid; penicillins such as amoxicillin, ampicillin, azlocillin, dicloxacillin, flucloxacillin, mezlocillin, methicillin, nafcillin, oxacillin, penicillins (including penicillin G and V), piperacillin, temocillin, and ticarcillin; polypeptides such as bacitracin, colistin, and polymyxin B; quinolones such as ciproflaxacin, enoxacin, gatifloxacin, gemifloxacin, levofloxacin, lomefloxacin, moxifloxacin, nadifloxacin, nalidixic acid, norfloxacin, ofloxacin, trovafloxacin, gepafloxacin, sparfloxacin, and temafloxacin; sulfonamides such as mafenide, sulfacetamide, sulfadiazine, sulfadithoxine, sulfamethizole, sulfamethoxazole, sulfanilamide, sulfasalazine, sulfisoxazole, and sulfonamidochrysoidine; tetracyclines such as demeclocycline, doxycycline, metacycline, minocycline, oxytetracycline, and tetracycline.

A pesticide intended for use against fungi is known as a fungicide. Examples of fungicides include acibenzolar, acypetacs, aldimorph, anilazine, aureofungin, azaconazole, azithiram, azoxystrobin, benalaxyl, benodanil, benomyl, benquinox, benthiavalicarb, binapacryl, biphenyl, bitertanol, bixafen, blasticidin-S, boscalid, bromuconazole, captafol, captan, carbendazim, carboxin, carpropamid, chloroneb, chlorothalonil, chlozolinate, cyazofamid, cymoxanil, cyprodinil, dichlofluanid, diclocymet, dicloran, diethofencarb, difenoconazole, diflumetorim, dimethachlone, dimethomorph, diniconazole, dinocap, dodemorph, edifenphos, enoxastrobin, epoxiconazole, etaconazole, ethaboxam, ethirimol, etridiazole, famoxadone, fenamidone, fenarimol, fenbuconazole, fenfuram, fenhexamid, fenoxanil, fenpropidin, fenpropimorph, ferbam, fluazinam, fludioxonil, flumorph, fluopicolide, fluopyram, fluoroimide, fluoxastrobin, flusilazole, flutianil, flutolain, flopet, fthalide, furalaxyl, guazatine, hexaconazole, hymexazole, imazalil, imibenconazole, iminoctadine, iodocarb, ipconazole, iprobenfos, iprodione, iprovalicarb, siofetamid, isoprothiolane, isotianil, kasugamycin, laminarin, mancozeb, mandestrobin, mandipropamid, maneb, mepanypyrim, mepronil, meptyldinocap, mealaxyl, metominostrobin, metconazole, methafulfocarb, metiram, metrafenone, myclobutanil, naftifine, nuarimol, octhilinone, ofurace, orysastrobin, oxadixyl, oxathiapiprolin, oxolinic acid, oxpoconazole, oxycarboxin, oxytetracycline, pefurazate, penconazole, pencycuron, penflufen, penthiopyrad, phenamacril, picarbutrazox, picoxystrobin, piperalin, polyoxin, probenzole, prochloraz, procymidone, propamocarb, propiconazole, propineb, proquinazid, prothiocarb, prothioconazole, pydiflumetofen, pyraclostrobin, pyrametostrobin, pyraoxystrobin, pyrazophos, pyribencarb, pyributicarb, pyrifenox, pyrimethanil, pyrimorph, pyriofenone, pyroquilon, quinoxyfen, quintozene, sedaxane, silthiofam, simeconazole, spiroxamine, streptomycin, tebuconazole, tebufloquin, teclofthalam, tecnazene, terbinafine, tetraconazole, thiabendazole, thifluzamide, thiphanate, thiram, tiadinil, tolclosfos-methyl, folfenpyrid, tolprocarb, tolylfluanid, triadimefon, triadimenol, triazoxide, triclopyricarb, tricyclazole, tridemorph, trifloxystrobin, triflumizole, triforine, validamycin, and vinclozolin.

A pesticide intended for use against plants is known as an herbicide. An herbicide (also known as 'weedkiller') is a substance that is toxic to plants and may kill, inhibit the growth of, or prevent the germination of plants. Herbicides are typically used to control the growth of or remove unwanted plants from an area of land, particularly in an agricultural context. Examples of herbicides include, but are not limited to, 2,4-D, aminopyralid, chlorsulfuron, clopyralid, dicamba, diuron, glyphosate, hexazinone, imazapic, imazapyr, methsulfuron methyl, picloram, sulfometuron methyl, triclopyr, fenoxaprop, fluazifop, quizalofop, clethodim, sethoxydim, chlorimuron, foramsulfuron, halosulfuron, nicosulfuron, primisulfuron, prosulfuron, rimsulfuron, thofensulfuron, tribenuron, imazamox, imazaquin, flumetsulam, cloransulam, thiencarbazone, fluoxpyr, diflufenzopyr, atrazine, simazine, metribuzin, bromoxynil, bentazon, linuron, glufosinate, clomazone, isoxaflutole, topramezone, mesotrione, tembotrione, acifluorfen, formesafen, lactofen, flumiclorac, flumioxazin, fulfentrazone, carfentrazone, fluthiacet-ethyl, falufenacil, paraquat, ethalfluralin, pendimethalin, trifluralin, butylate, EPTC, ecetochlor, alachlor, metolachlor, dimethenamid, flufenacet, and pyroxasulfone.

A pesticide intended for use against insects is known as an insecticide. Examples of insecticides are: organochlorides such as Aldrin, chlordane, chlordecone, DDT, dieldrin, endofulfan, endrin, heptachlor, hexachlorobenzene, lindane, methoxychlor, mirex, pentachlorophenol, and TDE; organophosphates such as acephate, azinphos-methyl, bensulide, chlorethoxyfos, chlorpyrifos, diazinon, chlorvos, dicrotophos, dimethoate, disulfoton, ethoprop, fenamiphos, fenitrothion, fenthion, malathion, methamdophos, methidathion, mevinphos, monocrotophos, naled, omethoate, oxydemeton-methyl, parathion, phorate, phosalone, phosmet, phostebupirim, phoxim, pirimiphos-methyl, profenofos, terbufos, and trichlorfon; carbamates such as aldicarb, bendiocarb, carbofuran, carbaryl, dioxacarb, fenobucarb, fenoxycarb, isoprocarb, methomyl; pyrethroids such as allethrin, bifenthrin, cyhalothrin, cypermethrin, cyfluthrin, deltamethrin, etofenprox, fenvalerate, permethrin, phenothrin, prallethrin, resmethrin, tetramethrin, tralomethrin, and transfluthrin; neonicotinoids such as acetamiprid, clothiandin, imidacloprid, nithiazine, thiacloprid, and thiamethoxam; ryanoids such as chlorantraniliprole, cyanthaniliprole, and flubendiamide.

A pesticide intended for use against mites is known as a miticide. Examples of miticides are permethrin, ivermectin, carbamate insecticides as described above, organophosphate insecticides as described above, dicofol, abamectin, chlorfenapyr, cypermethrin, etoxazole, hexythiazox, imidacloprid, propargite, and spirotetramat.

A pesticide intended for use against snails and other mollusks is known as a molluscicide. Examples of molluscicides are metaldehyde and methiocarb.

A pesticide intended for use against rodents is known as a rodenticide. Examples of rodenticides are warfarin, coumatetralyl, difenacoum, brodifacoum, flocoumafen, bromadiolone, diphacinone, chlorophacinone, pindone, difethialone, cholecalciferol, ergocalciferol, ANTU, chloralose, crimidine, 1,3-difluoro-2-propanol, endrin, fluroacetamide, phosacetim, pyrinuron, scilliroside, strychnine, tetramethylenedisulfotetramine, bromethalin, 2,4-dinitrophenol, and uragan D2.

A pesticide intended for use against viruses is known as a virucide. Examples of virucides are cyanovirin-N, griffithsin, interferon, NVC-422, scytovirin, urumin, virkon, zonroz, and V-bind viricie.

A persistent organic pollutant is a toxic organic chemical that adversely affects human and environmental health, can be transported by wind and water, and can persist for years, decades, or centuries owing to resistance to environmental degradation by natural chemical, biological, or photolytic processes. Persistent organic pollutants are regulated by the United Nations Environment Programme 2001 Stockholm Convention on Persistent Organic Pollutants. Examples of persistent organic pollutants are Aldrin, chlordane, dieldrin, endrin, heptachlor, hexachlorobenzene, mirex, toxaphene, polychlorinated biphenyl (PCBs), dichlorodiphenyltrichloroethane (DDT), dioxins, polychlorinated dibenzofurans, chlordecone, hexachlorocyclohexane ($\alpha$- and $\beta$-), hexabromodiphenyl ether, lindane, pentachlorobenzene, tetrabromodiphenyl ether, perfluorooctanesulfonic acid, endosulfans, and hexabromocyclododecane.

In some embodiments, the contaminated water, including one or more pollutants, and the nanocomposite material can be mixed for a period that is effective for pollutant removal. The mixing time may be varied depending on the specific conditions of the treatment process. In some embodiments, the contaminated water including one or more pollutants and the CoO/CaSiO$_3$@g-C$_3$N$_4$ are mixed for 180 minutes (min) or less, preferably 150 min or less, preferably 140 min or less, preferably 135 min or less, preferably 130 min or less, preferably 125 min or less, for 120 minutes or less, preferably 115 min or less, preferably 110 min or less, preferably 105 min or less, preferably 100 min or less, preferably 95 min or less and for 90 min or less, preferably 85 min or less, preferably 80 min or less, preferably 75 min or less, preferably 70 min or less, preferably 65 min or less, preferably 60 min or less, preferably 55 min or less, preferably 50 min or less, preferably 45 min or less, preferably 40 min or less, preferably 35 min or less and preferably 30 min or less.

At step 54, the method 50 includes exposing the reaction mixture to light. Light sources that can be used for water purification include natural sunlight, UV light, and visible light, depending on the photocatalyst's activation range. In some embodiments, the light source has a wavelength in the range of 50 to 1200 nm, preferably 100-1000 nm, preferably 200-800 nm.

At step 56, the method 50 includes removing the CoO/CaSiO$_3$@g-C$_3$N$_4$ nanocomposite material using filtration to form purified water, e.g., water having a concentration of pollutants that is less than the concentration of pollutants in the aqueous solution before contact with the CoO/CaSiO$_3$@g-C$_3$N$_4$ nanocomposite and before irradiating. Filtration may be performed through any typical means such as gravity filtration, vacuum filtration, centrifugal filtration, pressure filtration, granular media filtration, and membrane filtration, including microfiltration, ultrafiltration, nanofiltration, and reverse osmosis. In a preferred embodiment, removing the nanocomposite material is performed with membrane filtration. In some embodiments, the nanocomposite material may be subjected to thermal/chemical/biodegradation for easier removal of the nanocomposite material to form the purified water.

EXAMPLES

The following examples demonstrate a cobalt oxide/calcium silicate @graphitic carbon nitride (CoO@CaSiO$_3$@g-C$_3$N$_4$) nanocomposite material, method of preparation thereof, and bandgap energy properties. The examples are provided solely for illustration and are not to be construed as limitations of the present disclosure, as many variations thereof are possible without departing from the spirit and scope of the present disclosure.

Example 1: Fabricating the CaSiO$_3$

Equal moles of calcium nitrate (0.5 g) and sodium metasilicate (0.37 g) were dispersed in 100 milliliters (mL) of ethanol:water (1:1) in a 150 mL glass beaker and sonicated for 15 minutes. The mixture was transferred to a 200 mL autoclave and then placed in an oven operated at 180° C. for 2 hours. The product was dispersed in 500 mL distilled water with an ultrasonic bath for 10 minutes, filtered via a Buchner system, rinsed with distilled water, and dried at 120° C. for 1 hour.

Example 2: Fabricating the g-C$_3$N$_4$

About 30 grams (g) of urea (NH$_2$CONH$_2$) was placed in a 250 milliliters (mL) porcelain crucible and covered with its porcelain cover, then the crucible and cover were wrapped with three layers of aluminum foil to reduce the NH$_2$CONH$_2$ loss to sublimation. The crucible was heated via a furnace set at 600° C. for 45 min.

Example 3: Fabricating the CoO

About 10 g of cobalt (II) acetate (C$_4$H$_6$CoO$_4$) and 5 g of xylose (C$_5$H$_{10}$O$_5$) were placed in a 500 mL beaker. 100 mL distilled water was added to the mixture and heated until a clear solution was obtained. 10 mL of concentrated nitric acid (HNO$_3$) was added to the mixture, which was then heated until the carbonization of C$_5$H$_{10}$O$_5$. The mixture was placed in an oven set at 120° C. for 3 h; the black product was milled in a mortar, placed in a 150 mL porcelain dish, and calcined at 550° C. for 4 h.

Example 4: Fabricating the CoO/CaSiO$_3$@g-C$_3$N$_4$

An equal amount of calcium silicate (CaSiO$_3$), graphitic carbon nitride (g-C$_3$N$_4$), and cobalt oxide (CoO) (0.5 grams each) was transferred to a mono wave-200 vial (G30), dispersed in 20 mL ethylene glycol monomethyl ether via an ultrasonic bath for 30 min. The vial was closed with its teflon cover and placed in the Anton-Baar Monowave-200 operated at 180° C. and 5 bar pressure for one hour. The product was dispersed in 1 L distilled water with an ultrasonic bath for 30 min, filtered via a Buchner system, rinsed with distilled water, and dried at 150° C. for 2 h.

Figure 2:
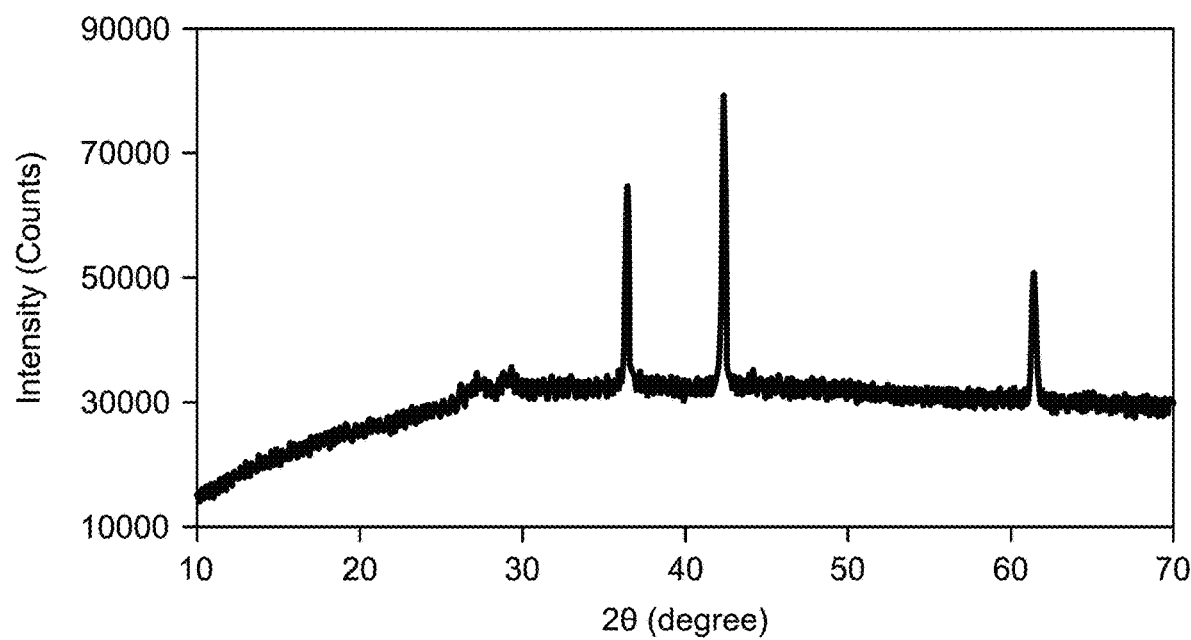
FIG. 2 shows X-ray diffraction (XRD) diffractogram of a CoO/CaSiO$_3$@g-C$_3$N$_4$ nanocomposite, according to certain embodiments.

The crystallinity and phase composition of the CoO/CaSiO$_3$@g-C$_3$N$_4$ catalyst were examined using X-ray diffraction (XRD), as presented in FIG. 2. The presence of sharp peaks with high intensity values indicates the highly crystalline nature of the nanocomposite. Based on an analysis of the diffraction patterns using standard JCPDS reference cards, CoO was identified as the primary phase with CaSiO$_3$ and g-C$_3$N$_4$ present as minor phases. The prominent peaks observed at 2$\theta$ values of 36.5°, 42.4°, 61.5°, 73.6°, and 77.5° correspond to the (111), (200), (220), (311) and (222) planes of the cubic CoO phase (Reference code No. 01-071-1178). Weak diffraction peaks at 2$\theta$ values of 27.6° and 28.9° were attributed to the CaSiO$_3$ phase (Reference code No. 01-084-0655), while a trace amount of quartz (SiO$_2$) was detected at 27.3° (Reference code No. 01-079-1911). The diffraction peak corresponding to g-C$_3$N$_4$ was observed at 61.4° (Reference code No. 01-087-1526). The absence of additional phases confirms the successful fabrication of the nanocomposite.

Figure 3A:
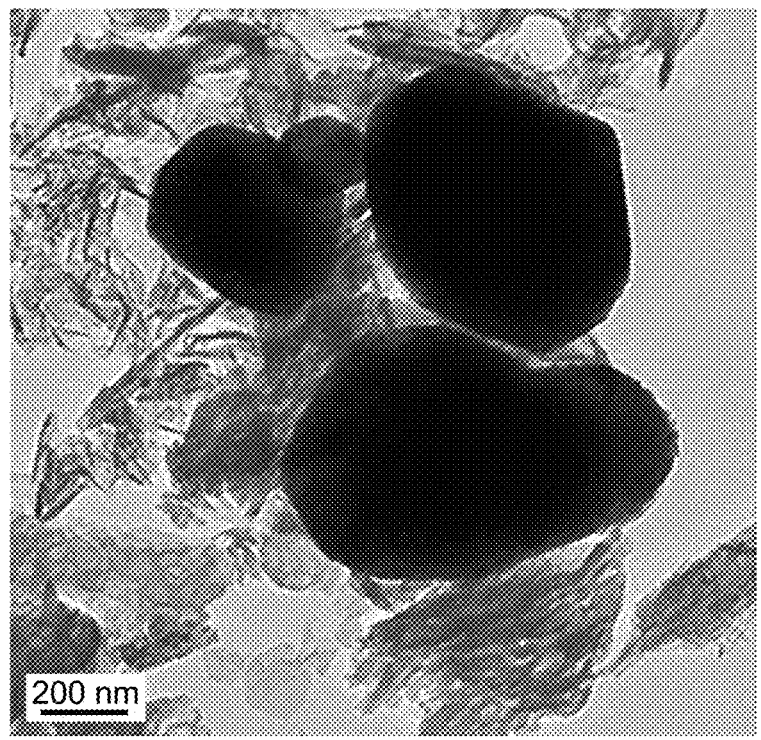
FIG. 3A shows a transmission electron microscopy (TEM) image of the CoO/CaSiO$_3$@g-C$_3$N$_4$ nanocomposite at 200 nanometers (nm), according to certain embodiments.
Figure 3B:
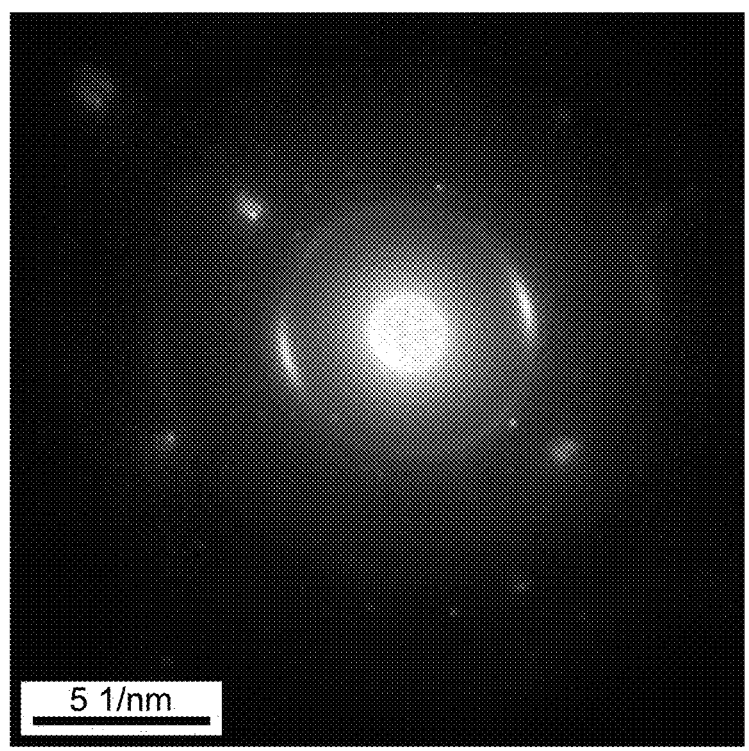
FIG. 3B shows selected area electron diffraction (SAED) pattern of the CoO/CaSiO$_3$@g-C$_3$N$_4$ nanocomposite, according to certain embodiments.

FIG. 3 shows the transmission electron microscopy (TEM) images illustrating the morphological features and nanoscale structure of the CoO/CaSiO$_3$@g-C$_3$N$_4$ nanocomposite. The TEM image (FIG. 3A) reveals a two-dimensional porous structure composed of curled and wrinkled nanosheets, along with platelets of g-C$_3$N$_4$. The image also demonstrates the well-dispersed, homogeneously distributed hexagonal-shaped metal oxide nanoparticles on the g-C$_3$N$_4$ nanosheets, with an average particle size of approximately 387 nanometers (nm). The corresponding selected area electron diffraction (SAED) pattern shown in FIG. 3B reveals diffraction spots with interplanar spacing of 0.288 nm, 0.256 nm and 0.186 nm, 0.142 nm due to ($CaSiO_3$: 131), (CoO: 111, $CaSiO_3$: 022), ($CaSiO_3$: –2-32), and (CoO: 220, $CaSiO_3$: –330, g-$C_3N_4$; 221) diffraction planes.

Figure 4A:
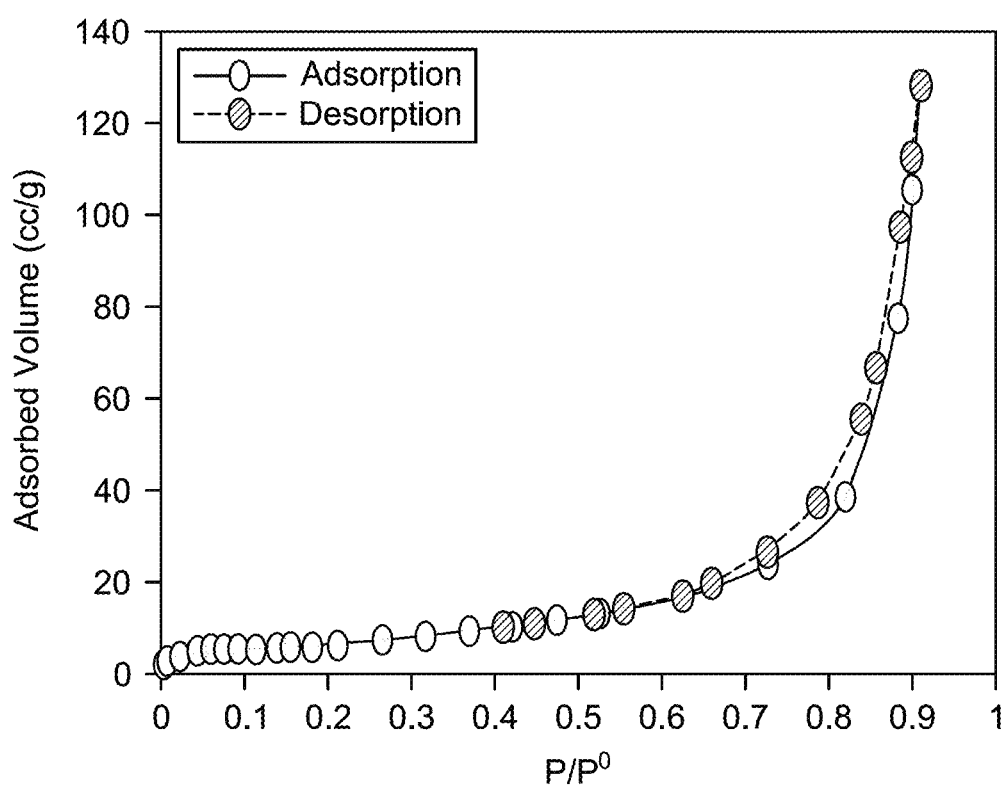
FIG. 4A is a graph depicting nitrogen (N$_2$) adsorption-desorption isotherms of the CoO/CaSiO$_3$@g-C$_3$N$_4$ nanocomposite, according to certain embodiments.
Figure 4B:
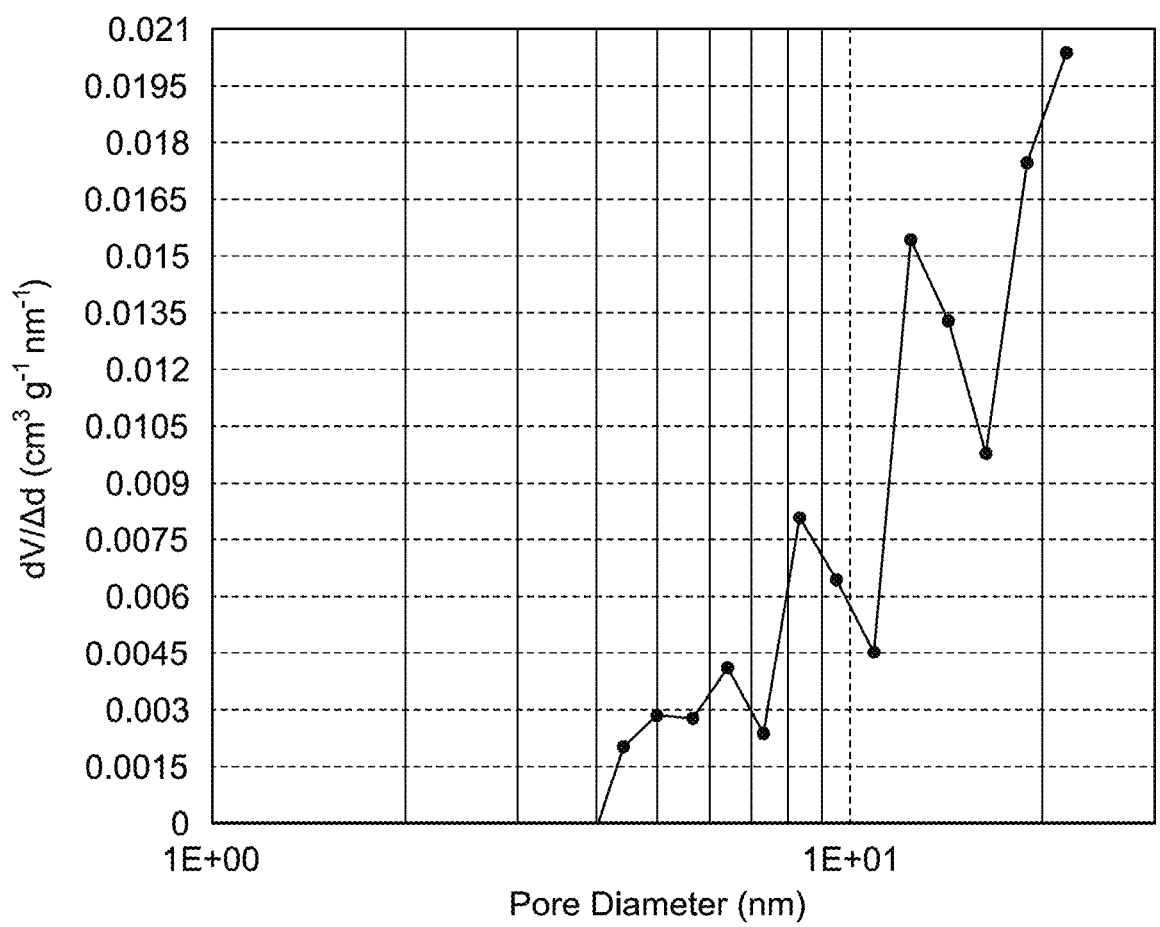
FIG. 4B is a graph depicting the pore size distribution curve of the CoO/CaSiO$_3$@g-C$_3$N$_4$ nanocomposite, according to certain embodiments.

FIG. 4 displays the nitrogen adsorption-desorption isotherms of CoO/$CaSiO_3$@g-$C_3N_4$ nanocomposite. The nitrogen sorption isotherm of the composite is type IV with a noticeable hysteresis loop, indicating the formation of mesoporous structures. However, shifting the loop to a relatively higher pressure ($P/P^0$=0.66-1) indicates the presence of wide mesopores, which may result from the deposition of metal oxides particles in the wide pores of g-$C_3N_4$. Furthermore, the Brunauer-Emmett-Teller (BET) surface area of the CoO/$CaSiO_3$@g-$C_3N_4$ sample was calculated to be 30.68 square meters per gram ($m^2\ g^{-1}$) (FIG. 4A). The high specific surface area reflects the good dispersion of these metal oxides nanoparticles on g-$C_3N_4$. Moreover, the pore size distribution curves, plotted using the Barrett-Joyner-Halenda (BJH) method, for the nanocomposite shown in FIG. 4B exhibited unimodal distribution with average pore diameters maximized at 21.82 nm and a pore volume of 0.198 cubic cemtimeters per gram ($cm^3\ g^{-1}$). All the isotherms belong to the $H_3$ category of pores, which do not exhibit limiting adsorption at high $P/P^0$, and arise due to aggregation of plate-like particles giving rise to slit-shaped pores. This indicates that the assembly of the nanocomposite produced a mesoporous array.

Photocatalytic processes that utilize a wide range of the visible light spectrum require materials with low bandgap energies, typically ranging from 1.77 to 2.92 eV, making them suitable candidates for visible light absorption and photocatalytic activity (Li, Y., et al., Efficient decomposition of organic compounds and reaction mechanism with BiOI photocatalyst under visible light irradiation, *Journal of Molecular Catalysis A: Chemical*, 2011, 334, 1-2, p. 116-122, incorporated herein by reference in its entirety). An objective in developing visible-light-responsive photocatalysts is to replace harmful ultraviolet radiation with safer visible light. The absorbance of the synthesized CoO/$CaSiO_3$@g-$C_3N_4$ composite was measured across the 200-800 nm wavelength range.

Further, the incorporation of CoO/$CaSiO_3$ with g-$C_3N_4$ led to a notable enhancement in the visible light absorption of the nanocomposite. This enhancement is likely due to the difference in bandgap energies between CoO/$CaSiO_3$ and pristine g-$C_3N_4$. When the CoO/$CaSiO_3$ was incorporated with g-$C_3N_4$, the absorption of the nanocomposite material in the visible area increased. The difference between the band gap energies of CoO/$CaSiO_3$ and bare g-$C_3N_4$ may be the cause of this occurrence.

The Tauc plot (Eq. 1) was employed in determining the bandgap-energy ($E_g$) for the synthesized photocatalyst.

$$\alpha h\gamma = A(h\gamma - E_g)^n \quad (1)$$

Where h represents the Plank constant, a and γ are the absorption coefficient and photonic frequency, and A is a material dependent constant, taken as 1 in this case. (Cheng, H., et al., One-step synthesis of the nanostructured AgI/BiOI composites with highly enhanced visible-light photocatalytic performances, *Langmuir*, 2010, 26, 9, p. 6618-6624, incorporated herein by reference in its entirety). By calculating the power of n, a value of n=½ was revealed to propose a direct permissible transition.

Figure 5A:
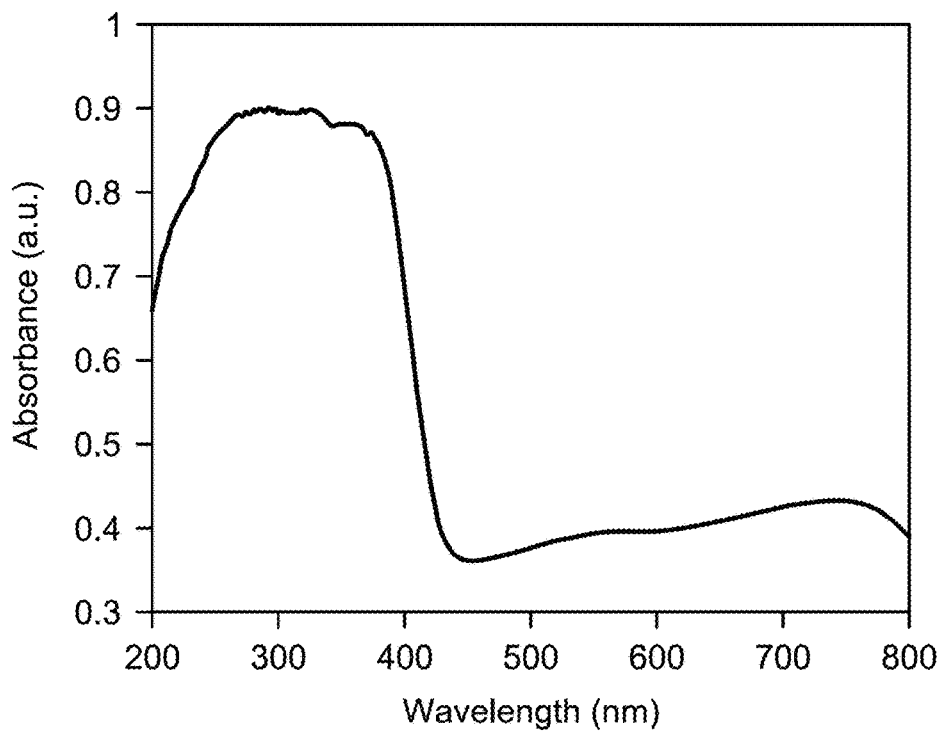
FIG. 5A is a graph depicting UV-Vis diffuse reflectance spectra (DRS) spectra of the CoO/CaSiO$_3$@g-C$_3$N$_4$ nanocomposite, according to certain embodiments.
Figure 5B:
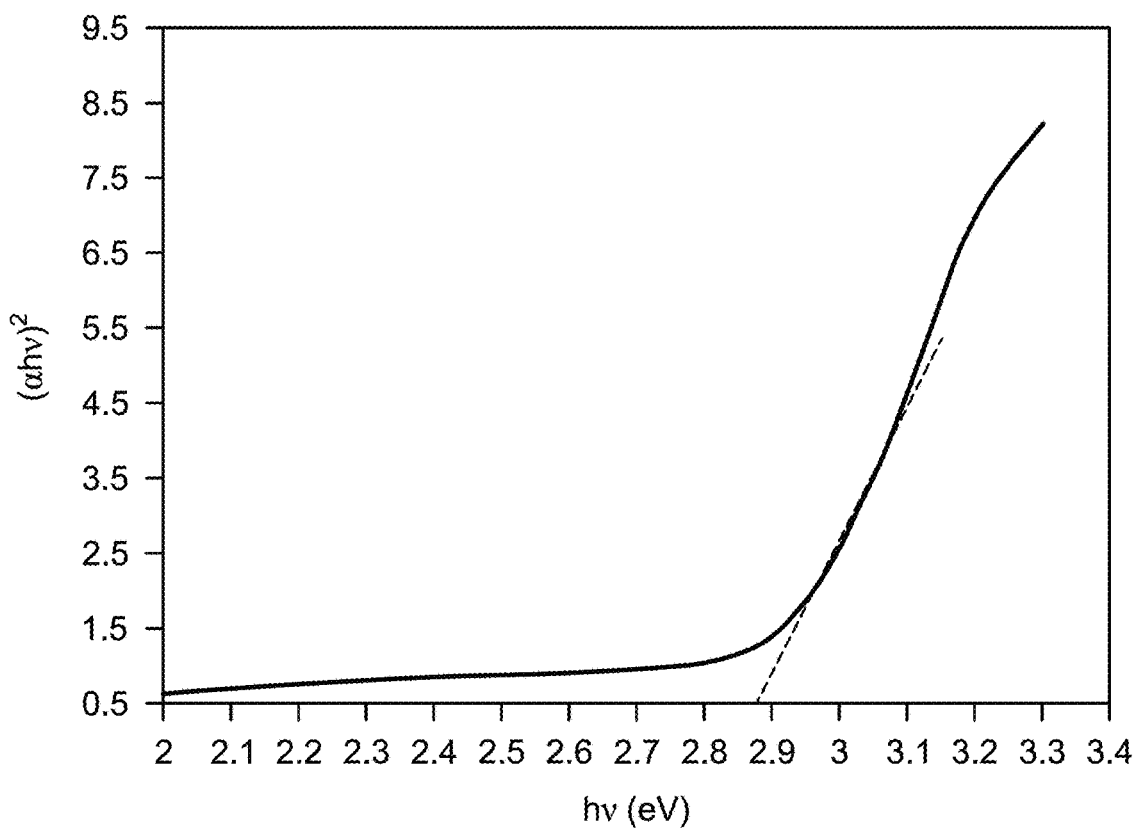
FIG. 5B is a graph depicting the band gap calculated for the CoO/CaSiO$_3$@g-C$_3$N$_4$ nanocomposite, according to certain embodiments.

As observed in FIG. 5B, the $E_g$ was estimated at 2.88 eV, corresponding to the prepared nanocomposite. The reduced band gap of the composite and increased response to the visible light were caused by the addition of metal oxide nanoparticles to the g-$C_3N_4$ matrix, achieving a more efficient utilization of solar energy and improving the photocatalytic activity of the nanocomposite. The estimated band gap typical that of BiOI, known for its high activities in degrading organic compounds under visible light, and the estimated band gap of other useful nanomaterials are found in the following references (1-4).

1. Mehrali-Afjani, M., et al., A brief study on the kinetic aspect of the photodegradation and mineralization of BiOI-$Ag_3PO_4$ towards sodium diclofenac, *Chemical Physics Letters*, 2020, 759, p. 137873.
2. Jeevanantham, N., et al., High-performance visible light photocatalytic activity of cobalt (Co) doped CdS nanoparticles by wet chemical route, *Journal of the Iranian Chemical Society*, 2019, 16, 2, p. 243-251.
3. Sabonian, M., et al., Preparation of ZnO nanocatalyst supported on todorokite and photocatalytic efficiency in the reduction of chromium (VI) pollutant from aqueous solution, *Iranian Journal of Catalysis*, 2019, 9, 3, p. 201-211.
4. Zeng, L., et al., Preparation of interstitial carbon doped BiOI for enhanced performance in photocatalytic nitrogen fixation and methyl orange degradation, *Journal of Colloid and Interface Science*, 2019, 539, p. 563-574, each incorporated herein by reference in their entirety.

The CoO/$CaSiO_3$@g-$C_3N_4$ nanocomposite was successfully synthesized through a multi-step process, and its characterization revealed a highly crystalline structure with well dispersed metal oxide nanoparticles. The nanocomposite exhibited a mesoporous structure with a high specific surface area, enhancing its potential for photocatalytic applications. The incorporation of CoO and $CaSiO_3$ with g-$C_3N_4$ reduced the band gap of the nanocomposite to 2.88 eV, which improves its visible light absorption and photocatalytic efficiency. This reduction in band gap allows for more efficient utilization of visible light/solar energy, making the nanocomposite a promising candidate for photocatalytic degradation of organic compounds under visible light.

Numerous modifications and variations of the present disclosure are possible in light of the above teachings. It is therefore to be understood that within the scope of the appended claims, the disclosure may be practiced otherwise than as specifically described herein.

The invention claimed is:

1. A method of water purification, comprising:
   mixing an aqueous solution containing one or more pollutants with a cobalt oxide/calcium silicate @graphitic carbon nitride (CoO/$CaSiO_3$@g-$C_3N_4$) nanocomposite material to form a reaction mixture;
   exposing the reaction mixture to light; and
   removing the CoO/$CaSiO_3$@g-$C_3N_4$ nanocomposite material using filtration to form purified water,
   wherein the CoO/$CaSiO_3$@g-$C_3N_4$ nanocomposite material comprises hexagonal metal oxide nanoparticles comprising a CoO phase and a $CaSiO_3$ phase dispersed on a matrix of g-$C_3N_4$ nanosheets,
   wherein the hexagonal metal oxide nanoparticles have an average particle diameter in a range from 340 to 440 nanometer (nm), and
   wherein the CoO/$CaSiO_3$@g-$C_3N_4$ nanocomposite material has a band gap energy in a range from 1.5 to 3.75 electron volt (eV).

2. The method of claim 1, wherein the CoO/$CaSiO_3$@g-$C_3N_4$ nanocomposite material has a band gap energy in a range from 2.0 to 3.5 eV.

3. The method of claim 2, wherein the CoO/CaSiO$_3$@g-C$_3$N$_4$ nanocomposite material has a band gap energy in a range from 2.25 to 3.25 eV.

4. The method of claim 3, wherein the CoO/CaSiO$_3$@g-C$_3$N$_4$ nanocomposite material has a band gap energy in a range from 2.5 to 3.15 eV.

5. The method of claim 4, wherein the CoO/CaSiO$_3$@g-C$_3$N$_4$ nanocomposite material has a band gap energy in a range from 2.7 to 3.05 eV.

6. The method of claim 5, wherein the CoO/CaSiO$_3$@g-C$_3$N$_4$ nanocomposite material has a band gap energy of 2.88 eV.

7. The method of claim 1, wherein the hexagonal metal oxide nanoparticles have an average particle diameter in a range from 370 to 410 nm.

8. The method of claim 7, wherein the hexagonal metal oxide nanoparticles have an average particle diameter in a range from 380 to 400 nm.

9. The method of claim 8, wherein the hexagonal metal oxide nanoparticles have an average particle diameter in a range from 382 to 395 nm.

10. The method of claim 9, wherein the CoO/CaSiO$_3$@g-C$_3$N$_4$ nanocomposite material has a mass ratio of CoO:CaSiO$_3$:g-C$_3$N$_4$ phases in a range from 0.25-10:0.25-10:0.25-10.

11. The method of claim 1, wherein the CoO/CaSiO$_3$@g-C$_3$N$_4$ nanocomposite material has a Brunauer-Emmett-Teller (BET) surface area of at least 20 square meters per gram (m$^2$·g$^{-1}$).

12. The method of claim 11, wherein the CoO/CaSiO$_3$@g-C$_3$N$_4$ nanocomposite material has a BET surface area of at least 25 m$^2$g$^{-1}$.

13. The method of claim 12, wherein the CoO/CaSiO$_3$@g-C$_3$N$_4$ nanocomposite material has a BET surface area of at least 30 m$^2$g$^{-1}$.

14. The method of claim 13, wherein the CoO/CaSiO$_3$@g-C$_3$N$_4$ nanocomposite material has a BET surface area of 30.68 m$^2$·g$^{-1}$.

15. The method of claim 1, wherein the CoO/CaSiO$_3$@g-C$_3$N$_4$ nanocomposite material has a pore volume of at least 0.10 cubic centimeters per gram (cm$^3$·g$^{-1}$).

16. The method of claim 15, wherein the CoO/CaSiO$_3$@g-C$_3$N$_4$ nanocomposite material has a pore volume of at least 0.15 cm$^3$g$^{-1}$.

17. The method of claim 16, wherein the CoO/CaSiO$_3$@g-C$_3$N$_4$ nanocomposite material has a pore volume of at least 0.195 cm$^3$g$^{-1}$.

18. The method of claim 1, wherein the CoO/CaSiO$_3$@g-C$_3$N$_4$ nanocomposite material has an average pore diameter in a range from 10 to 30 nm.

19. The method of claim 18, wherein the CoO/CaSiO$_3$@g-C$_3$N$_4$ nanocomposite material has an average pore diameter in a range from 15 to 27 nm.

20. The method of claim 19, wherein the CoO/CaSiO$_3$@g-C$_3$N$_4$ nanocomposite material has an average pore diameter of 21.82 nm.

* * * * *